(12) United States Patent
McClintock et al.

(10) Patent No.: US 10,187,362 B1
(45) Date of Patent: Jan. 22, 2019

(54) SECURE STREAMLINED PROVISIONING OF REMOTE ACCESS TERMINALS

(71) Applicant: Amazon Technologies, Inc., Seattle, WA (US)

(72) Inventors: Jon Arron McClintock, Seattle, WA (US); John Clark Coonley Duksta, Seattle, WA (US); Katharine Nicole Harrison, University Place, WA (US); Matthew Ryan Jezorek, Maple Valley, WA (US); Brian Young Lee, Seattle, WA (US); Maarten Van Horenbeeck, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 14/745,610

(22) Filed: Jun. 22, 2015

(51) Int. Cl.
*G06F 21/00* (2013.01)
*H04L 29/06* (2006.01)
*G06F 21/30* (2013.01)
*G06F 21/44* (2013.01)

(52) U.S. Cl.
CPC .......... *H04L 63/0457* (2013.01); *G06F 21/30* (2013.01); *G06F 21/44* (2013.01); *H04L 63/0272* (2013.01); *H04L 63/083* (2013.01)

(58) Field of Classification Search
CPC .......... G06F 21/30; G06F 21/31; G06F 21/33; G06F 21/335; G06F 21/36; G06F 21/44
See application file for complete search history.

(56) References Cited

U.S. PATENT DOCUMENTS

| | | | |
|---|---|---|---|
| 2012/0146918 A1* | 6/2012 | Kreiner | H04M 1/7253 345/173 |
| 2014/0115580 A1* | 4/2014 | Kellerman | G06F 9/455 718/1 |
| 2015/0095933 A1* | 4/2015 | Blackburn | H04M 7/0078 725/25 |
| 2015/0169315 A1* | 6/2015 | Fong-Jones | G06F 8/61 713/2 |

* cited by examiner

*Primary Examiner* — Edward Zee
(74) *Attorney, Agent, or Firm* — Davis Wright Tremaine LLP

(57) ABSTRACT

A method and system are provided that create a limited use secure environment (LSE) image such as a limited use operating system installation that can be booted from a removable medium (e.g. CD or flash drive). The limited use secure environment is a limited purpose OS, web browser, etc. that prevents undesired activities. When the limited use secure environment boots, it initiates a pairing operation in which a pairing code and user credentials are conveyed to an authorization server. Once the pairing code and credentials are confirmed, a provisioning service provides configuration credentials to the limited use secure environment to enable the limited use secure environment to establish a secure connection through a gateway to resources of interest.

20 Claims, 8 Drawing Sheets

SECURE STREAMLINED PROVISIONING OF REMOTE ACCESS TERMINALS

BACKGROUND

In client server communications, trust establishment between communicating parties is an important aspect of securely communicating data between the parties. Numerous conventional systems exist for establishing secure network connections between clients and servers, such as a virtual private network. However, these conventional systems in general required the client and server to have certain application specific software and predetermined information regarding one another such as identifications, addresses, security information, configuration information and the like. It is time-consuming, slow, expensive and challenging to continuously update and maintain the necessary information at the client and server.

Further, business environments today commonly rely on remote access by individuals of secure resources through various types of computing devices. An individual may not always use a common computing device to access secure resources. Further, it is difficult to ensure that a user continuously updates and maintains all appropriate security measures on a computing device.

Moreover, it is difficult for a network manager to monitor remote computing devices in a manner that prevents unauthorized collection and distribution of sensitive information. For example, malware or other malicious software may attack a remote computing device and, unknown to the user or network manager, the malware may collect and forward sensitive information to an unauthorized third-party. In addition, the user may locally capture sensitive information, such as through screenshots, printing, emailing and the like, to facilitate performance of their job, or for other legitimate or illegitimate reasons. Conventional network connection solutions do not offer adequate remedies to prevent the foregoing and other problems.

A need remains for faster, less expensive and less challenging mechanisms for establishing secure network connections. A need also remains to prevent unauthorized capture and dissemination of sensitive information from a remote computing device.

DETAILED DESCRIPTION

Figure 1:
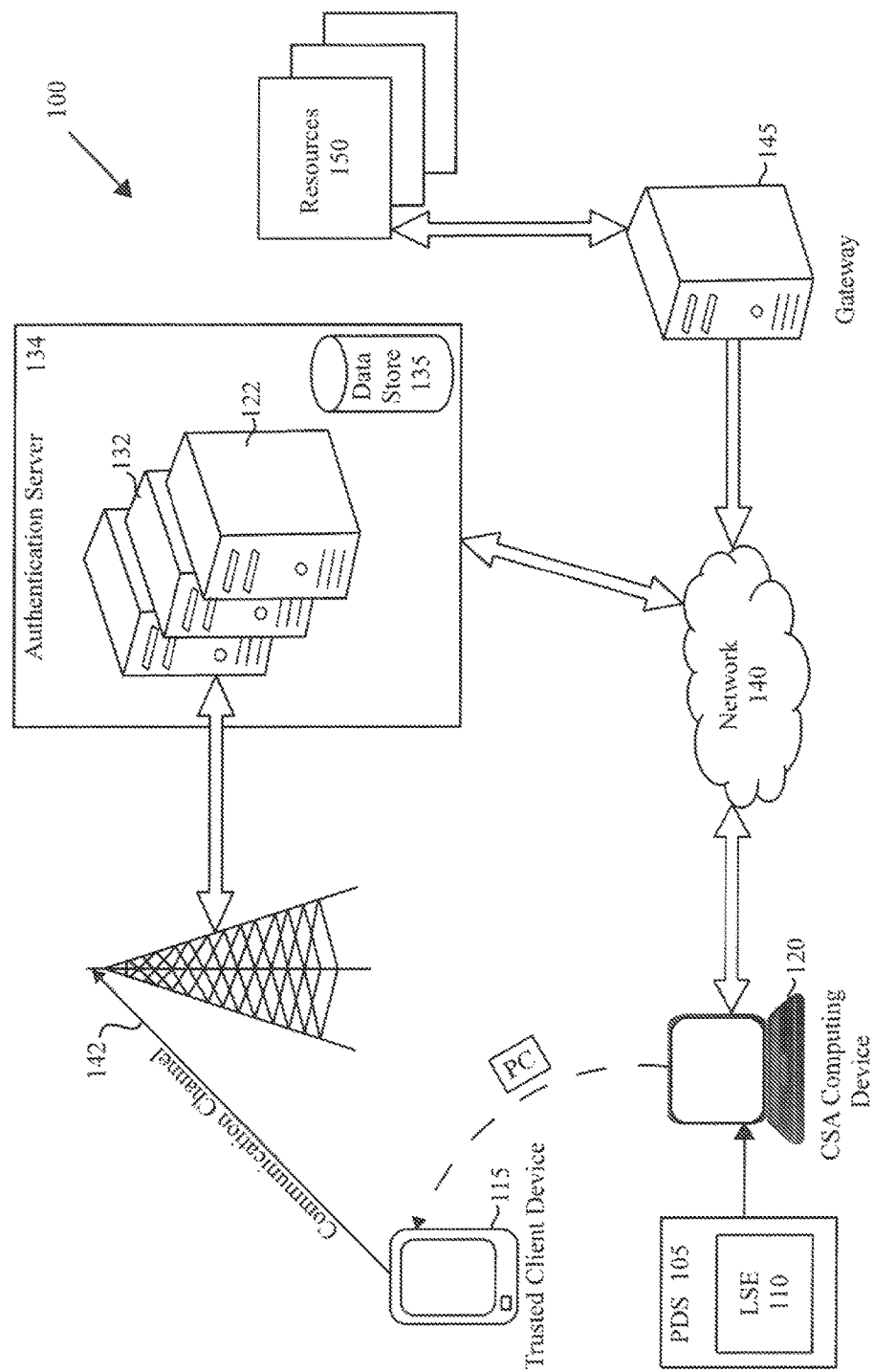
FIG. 1 is a block diagram of a system for providing computing devices access to online resources according to various embodiments described herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A secure streamlined provisioning process is provided for authenticating a remote computing device before granting a remote user access to sensitive services and information on a network. A system is provided to grant authorized individuals access to sensitive services, even when the individuals utilize an unknown or untrusted computing device. For example, the authorized individuals may represent customer service agents (CSA) or other employees that work remotely to provide various services and functions to a business. The CSA may use various computing devices to access resources through a network in order to perform various jobs and functions, once establishing a network connection.

However, existing network connection solutions may be slow, expensive and challenging to maintain. Further, after establishing a network connection through an existing solution, the potential exists that sensitive information may be captured by or through the computing device and conveyed to $3^{rd}$ parties, either with or without the knowledge of the customer service agent.

The process for establishing network connections is streamlined and the security afforded at the computing device is improved by providing a limited use secure environment (LSE) that is configured to at least partially implement an initial provisioning process for establishing a secure connection with the gateway service and then gain access to resources. The LSE may represent a limited use operating system, a time limited application and the like. When the user wishes to initiate a secure session with one or more resources, the user connects a portable data store (containing the LSE) to the computing device. The LSE takes at least partial control over the functionality of the computing device. For example, the LSE may place limits on the features available to the user of the computing device (e.g., disabling print options, blocking export options, and preventing access to un-authorized websites, such as social media). The LSE prevents the user (and malicious third parties) from intentionally or unintentionally capturing sensitive information in a manner that is unsecure, such as by printing content, saving screenshots, conveying email, and the like.

Once the LSE is activated, before the user is given access to the resources, the system performs an authentication process, utilizing an authentication server. The authentication process seeks to verify that various aspects of the system are "trustworthy", such as to ensure that the LSE is a valid/certified LSE, that the LSE has established secure control over the computing device and that an authorized user is operating the LSE. To establish the trustworthiness of the system, environment credentials for the LSE (e.g. a pairing code) and credentials for the user (e.g. user ID and password) are combined and passed to the authentication server by a trusted client device (e.g., a smartphone, table device, etc. controlled by the user). Once the server receives the credentials from the trusted client device and validates the credentials, the authentication server authorizes a provisioning service (therein or separate therefrom) to provide configuration information to the computing device to establish a connection with the gateway service. By withholding the configuration information until the environment and user credentials are validated, the processes and systems herein are gateway agnostic, thereby affording more latitude in the types and natures of the gateways with which the computing device may interact.

The LSE has a limited life such that the individual is provided with a time-limited, authenticated session to access one or more resources. The session may be time-limited in various manners, such as number of uses, number of hours and the like, after which the LSE becomes obsolete and can no longer be used to establish a secure connection with the system. Once the LSE becomes obsolete, the authentication server 134 no longer recognizes the LSE and denies further access.

Other features and benefits are provided in accordance with embodiments herein as described hereafter.

Overall Architecture

FIG. 1 is a block diagram of a system 100 for providing customer service agent computing devices access to account-based online resources according to various embodiments described herein. The system 100 includes one or more computing devices 120 that are accessible to a user and are configured to communication via the network 140 with one or more resources 150 through one or more gateway services 145. By way of example, the computing device 120 may be a mobile device, such as a cellular telephone, smartphone, tablet, gaming systems, a streaming media hub device or other portable electronic terminal that is configured to access the network 140 over a wired or wireless connection. Optionally, the computing device 120 may represent a voice command device with functions including question answering, playing music and controlling smart devices. Additionally or alternatively, the computing device 120 may be a wired or wireless communication terminal, such as a desktop computer, laptop computer, network-ready television, set-top box, and the like. The computing device 120 may be configured to access the network using a web browser or a native application executing thereon. In some embodiments, the computing device 120 may have a physical size or form factor that enables it to be easily carried or transported by a user, or the computing device 120 may have a larger physical size or form factor than a mobile device.

The computing device 120 is configured to access online resources 150, including web-based or network-based data, applications, and services, via the network 140. The network 140 may represent one or more of a local area network (LAN), a wide area network (WAN), an Intranet or other private network that may not be accessible by the general public, or a global network, such as the Internet or other publicly accessible network. The network 140 provides communication between the computing device 120 and one or more online resources 150 (such as web servers) configured to provide the aforementioned online data, applications, or services. The online resource 150 may include a network transceiver, processor, memory, and/or other circuitry configured to coordinate and manage operations for delivering online resources to the computing device 120.

By way of example, a customer service agent may login through a computing device 120, in order to provide support and other customer service related functions to end-users of client devices 147 (FIG. 2) through one or more resources 150. While illustrated as a single entity in FIG. 1, it will be understood that, in some embodiments, the online resources 150 may represent one or more physical or virtual servers that are configured to deliver online resources to the computing device 120. Examples of the online resources 150 include, but are not limited to, web-based or network-based data storage services, social networking applications, shopping services, microblogging accounts, payment services, multimedia content delivery services (for delivery of online magazines, music, video, etc.) and financial services (such as credit/banking services). The resource 150 may represent a Web service or a network service for an e-commerce business, financial institution, or any other commercial, noncommercial, personal, nonprofit or other entity.

The online resource 150 may require a subscription or account in order to access the different online resources provided thereby. As used herein, the term "account-based online resource" may refer to network-accessible data, applications, services, or combinations thereof that require an account or subscription to access the content or services provided thereby. The system 100 also includes a data store 135 that contains account information for one or more customer service agent. The data store 135 may be embodied in nonvolatile memory, such as flash, magnetic, or optical rewritable nonvolatile memory. The CSA account information stored in the data store 135 may include a listing of CSA accounts and online resources to which the accounts correspond. The CSA accounts may include information identifying the user or CSA that has registered for the online resource, such as the customer's name, mailing address, e-mail address, phone number, payment. The CSA account information may also include information that may be used to verify or authenticate the CSA to access the account. For example, for the CSA account, the CSA account information may include a username and a password selected by the CSA to access the account. In accordance with embodiments described herein, the CSA account information stored in the data store 135 further includes registration information identifying a secure environment associated with the account.

The system also includes one or more trusted client devices 115 to be used by the user. The client device 115 may represent a cellular phone, tablet device, text messaging device, permanent home phone, a set-top box, a wearable device such as a smart watch or smart glasses, a home automation device, a network attached storage device, a gaming device, a streaming media hub device, a voice command device or any other communications device that is generally uniquely identifiable and uniquely associated with an individual user (such as through a telephone number, IP address or otherwise). In the example of FIG. 1, the client device 115 represents a cellular telephone that communicates with a cellular network over one or more communications channels 142. The cellular network in turn communicates with the authentication server 134 as explained herein. The communication between the client device 115 and the cellular network may be unidirectional or bidirectional. A communications channel 142 may be provided by any communications provider, such as any source that disseminates information. The network 140 and communications channel 142 may be physically/logically separate channels. Optionally, the network 140 and communications channel 142 may be separate channels over the same underlying network.

The communications channel 142 represents a trusted channel of communication. A trusted channel of communication is "trusted" in the sense that it is presumed to be controlled by the owner of the respective user account. In other words, access to a trusted channel of communication may be used to authenticate the owner of the respective user account. The decision to trust a particular channel of communication may be made by an organization, ecommerce provider or other entity. For example, irrespective of whether email is inherently trustworthy or untrustworthy, email may be designated as a trusted channel of communication by an organization that manages or provides the user accounts. Channels that are designated as trusted may later be designated as untrusted in some scenarios. To illustrate the use of a trusted channel of communication, when creating a social networking account, a user may provide an email address for reset purposes. The provider of the social networking account may then trust that the email address is controlled by the user because access to the email account corresponding to the email address may facilitate resetting the password to the social networking account. It may be the case that the trusted channel of communication employs a different communication protocol from what is employed by the user account. For example, the user account may employ hypertext transfer protocol (HTTP), while the trusted channel of communication may employ simple mail transfer protocol (SMTP).

Non-limiting examples of trusted channels of communication may include email accounts, telephone lines, mailing addresses, social networking accounts, instant messaging systems, voice over internet protocol (VoIP) channels, mobile device management (MDM) channels, trusted input/output devices of the client devices managed by a trusted platform module (TPM), near-field communications (NFC) channels, custom communications channels, and/or other channels of communication.

Certain types of trusted channels of communication, such as email and short message service (SMS), may terminate on multiple client devices. Other types of trusted channels of communication are device specific, such that the trusted channel of communication can only terminate at one specific client device. For example, a trusted channel of communication may be tied to a specific mobile device by a device identifier. Communications through such a channel may be encrypted using the device identifier. Even if the data traffic to the mobile device is intercepted, it remains encrypted and otherwise unusable except for the specific mobile device.

The client device 115 may include a provisioning application 117 (FIG. 2) that operates to perform various functions described herein. For example, the provisioning application 117 may obtain a pairing code, such as by scanning a QR code, recording alphanumeric text, video, audio, images and the like. The provisioning application 117 combines the pairing code with user credentials entered by the user (e.g. ID and password). The provisioning application 117 directs the client device 115 to convey the pairing code and user credentials as an authorization request over a predetermined communications channel 142.

A portable data store 105 is provided and is removably communicatively coupled to the computing device 120. Optionally, the portable data store 105 may also be removably physically coupled to he computing device 120 such as when the portable data store 105 represents a CD, a flash drive, USB memory stick, or any other removable storage medium. As one example, the portable data store 105 stores an LSE 110 that is configured to control operation of the computing device 120, once loaded, as explained hereafter to maintain a trusted environment within which customer service agent may work. The LSE 110 may represent a limited use operating system, application, remote desktop protocol client, workspace client and the like. The LSE 110 represents a function limited environment by providing access to certain function services while preventing undesired functions/activities. During operation, once the LSE 110 is loaded onto the computing device 120, the LSE 110 converts a remote access terminal, such as the computing device 120 into a trusted client. To do so, the LSE 110 constrains or otherwise limits the computing device 120 to only perform authorized actions and disables functions that may otherwise compromise the security of the computing device 120. For example, the LSE 110 may disable any peripheral devices or drivers that would otherwise enable information to be recorded or otherwise conveyed from the computing device 120. For example, features may be disabled, such as to prevent printing, prevent the capture of screenshots, disable the ability to store on a CD or memory stick, disable the wireless connection, limit content that may be conveyed over a wireless link, disable any features that may permit cutting and pasting of content to a web browser, block web interaction with any social media, block web interaction to any URL not on an approved list, and the like.

Additionally or alternatively, the LSE 110 may limit access to select tools. For example, the web browser may block access to certain websites (e.g. social media). By limiting access to select applications/tools, a CSA may be afforded the ability to work, within the secure environment, through various types of web browsers of the CSA's choice, while ensuring that the web browser can be trusted to perform only authorized actions and that the computing device 120 can be trusted to maintain security and not record or divulge information.

The LSE 110 also represents a time limited environment that is configured to exhibit a short active life, such as for a few hours or days following the initial loading and login. As one example, the LSE 110 may have an active life corresponding to one or more shifts associated with the customer service agent. The active life of an LSE 110 may be managed in various manners. For example, the LSE 110 may maintain a useful life calculator (ULC) 112 (FIG. 2) that monitors use of the LSE 110 and when to deactivate the LSE 110. The ULC 112 may count the number of remote access sessions implemented in connection with the LSE 110, and/or the number of hours of use. As another example, the ULC 112 may track a select termination date, such that when the current date reaches the select termination date, the LSE 110 is deactivated. When the time limit ends, the LSE 110 can no longer be used, as explained herein.

Optionally, the secure environment need not be created at the operating system level. Instead, the secure environment may be implemented within a web browser that is automatically launched upon loading the application/environment from the portable data store 105. As another example, the secure environment may be defined as a remote desktop protocol (RDP) client. The RDP client may present a user's desktop from a remote RDP server. As another example, the secure environment may be defined as a workspace client.

The gateway service 145 maintains a secure network connection between the computing device 110 and one or more resources 150, but only after the authentication server 134 has confirmed that the computing device 120, LSE 110 and user are trustworthy. The authentication server 134 includes a provisioning service 122, an authorization service 132 and data store 135, the operations which are described herein. The authentication server 134 performs the pairing operation based on the authentication request that includes an environment credential and a user credential. The environment credential is associated with the LSE 110 that, when loaded onto a computing device, prevents unauthorized actions at the computing device while accessing a resource of interest. In particular, the environment credential uniquely identifies the LSE. The user credential is associated with the user of the computing device. In particular, the user credential uniquely identifies the user and/or computing device. The authentication server 134 also presents configuration credentials to the LSE 110 that enables the computing device to establish a secure network connection through the gateway service 145 with the resource of interest 150.

Figure 2:
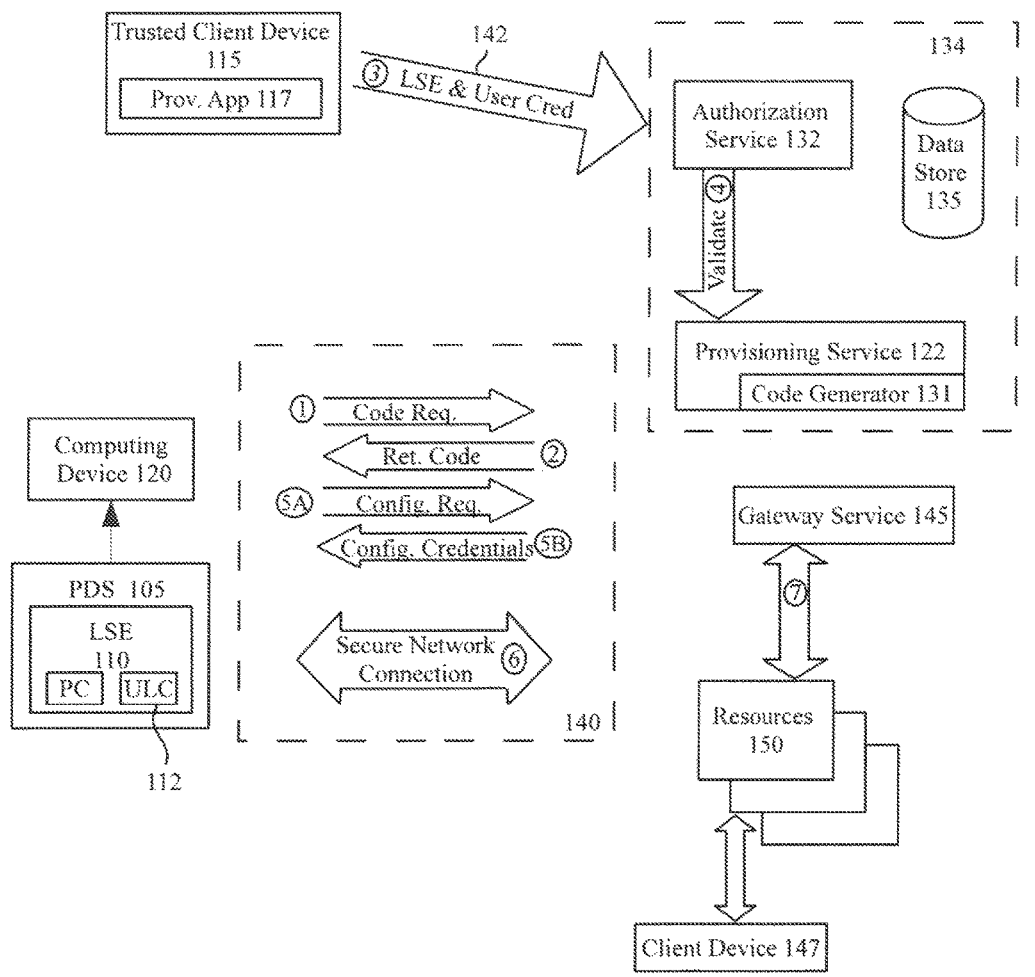
FIG. 2 illustrates a functional diagram of portions of the system of FIG. 1 as well as certain data, information and content conveyed in accordance with embodiments herein.

FIG. 2 illustrates a functional diagram of portions of the system 100 of FIG. 1 as well as certain data, information and content conveyed there between. In FIG. 2, the computing device 120, client device 115 and portable data store 105 are implemented as described herein to communicate with the authentication server 134 to perform a pairing operation. To establish a trustworthy nature of the computing device 120 and LSE 110, the provisioning service 122 and authorization service 132 exchange information and data with the computing device 120 over at least two separate channels, such as through a first network connection (over a network 140) and through a separate communications channel 142 or a second network connection. In accordance with embodiments herein, the authorization process seeks to validate various aspects of the system 100, wherein the various aspects represent points at which a third-party attack may breach security. For example, the authorization process validates the LSE 110, as well as one or more of the user, the computing device 120 and/or the client device 115. While certain examples are presented herein to validate these various aspects, it is recognized that additional validation techniques may be included, and that one or more of the aspects (e.g. image, devices, and user) may not be validated.

The provisioning service 122 is configured to communicate with the computing device (and LSE 110) during a pairing operation to establish device authentication. When the pairing operation is completed, the provisioning service 122 is further configured to communicate with the computing device 120 (and LSE 110) to provide secondary connection credentials, also referred to as configuration credentials, to be used during operation of the LSE 110 to interact with the gateway service 145.

Within the pairing operation, to perform image authentication, when an LSE 110 is launched, booted up or otherwise activated, the LSE 110 passes a code request (1) over the network 140 to the provisioning service 122. The code request (1) may contain information identifying the LSE 110, as well as (optionally) the computing device 120 and CSA. In response to the code request (1), the provisioning service 122 analyzes the code request to determine whether the provisioning service 122 recognizes the LSE 110. When the code request is recognized, the provisioning service 122 generates a pairing code that is passed (2) as a return code over the network 140 to the computing device 120.

The provisioning service 122 may generate the return pairing code in various manners. For example, the provisioning service may include a code generator 131 that generates the pairing code. By way of example, the pairing code may represent numbers, letters, characters, colors, images, video, sound or music. The pairing code may be any unique identifier, such as a randomly generated character string, and may be represented by a one-dimensional or multi-dimensional machine-readable code, such as a QR code, in some embodiments. For example, the code generator 131 may generate the code based on a content of the code request, or in randomly response to (but without regard for the content of) the code request. In other embodiments, the code generator 131 may retrieve or select the code from one or more previously generated codes stored in the data store 135.

Once the provisioning service 122 supplies a return pairing code (2), the provisioning service 122 also stores the return pairing code in the data store 135, for future access by the authorization service 132. Additionally or alternatively, the return pairing code may be provided directly to the authorization service 132. The provisioning service 122 may also provide, to the authorization service 132, other information that is received in connection with the code request (1) such as computing device/environment identification and/or addressing information, a serial number, and/or an IP address or network ID.

The authorization service 132 is configured to monitor an authorization channel 142 for authorization requests. The authorization service 132 may include a network transceiver, processor, memory, and or other circuitry configured to coordinate and manage receipt of authentication requests. The authorization service 132 analyzes the authorization request (3) as explained herein.

By way of example, the authorization request may include user credentials, such as a user ID and password. The authorization request further includes device credentials, and environment credentials (the return (pairing) code (1). The authorization requests (3) is conveyed from the client device 115, or alternatively from a separate device maintained by the CSA. For example, the CSA may convey the authorization request from a mobile device such as an electronic tablet, cellular phone or otherwise. As yet a further example, the CSA may convey the authorization request over a communications channel such as email, by telephone, SMS messaging and the like. The channel over which the authorization requests are conveyed may represent a separate channel through the network 140 or a communications channel 142 over a separate medium, such as a cellular network, a traditional telephone network, or a local or wide area network that is separate from the network 140.

The pair code (and other information interest) may be passed from the computing device 120 and/or PDS 105 to the trusted client device 115 in various manners. For example, near field communication may be utilized. In addition to near field communications, other means for short-range inter-device communication may also be utilized in accordance with the systems and methods of the present disclosure. Such compatible technologies include, but are not limited to, induction wireless, infrared wireless (such as technologies operating according to specifications and protocols provided by the Infrared Data Association, or IrDA) or ultra wideband formats. In some embodiments, the trusted client device 115 and computing device 120 may utilize short-range, low-power and high-frequency radio transmissions, such as Bluetooth®. In still other embodiments, the trusted client device 115 and computing device 120 may support acoustic-based data transfer. For example, the computing device 120 may include software components and a speaker that enable the computing device 120 to broadcast data to the trusted client device 115 as sound waves, while the trusted client device 115 may include software components and a microphone that enable the trusted client device 115 to receive the data embedded in the sound waves. Thus, one or more of radio signal-based data transfer (e.g., NFC or Bluetooth®), light-based data transfer (e.g., infrared data transfer), an acoustic-based data transfer (e.g., sound wave-embedded data), or magnetic field-based transfer (e.g., reading the code from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein.

The authorization service 132, upon receiving an authorization request, identifies the user credentials, pairing code, provisioning application credentials and the computing/device credentials. The authorization service 132 may access the data store 135 to compare the credentials and to compare the pairing code received at (3) with one or more return codes and certificates stored by the provisioning service 122 in the data store 135. When the authorization service 132 verifies matches between the credentials and certificates and the pairing codes, a validation message (4) is passed to the provisioning service 122. The validation message (4) includes, among other things, an identification of the LSE 110 and computing device 120 validated.

In parallel with the operations at (1) through (3), the LSE 110 may also transmit a configuration request (5A) over the network 140 to the provisioning service 122. Additionally or alternatively, the LSE 110 may convey the configuration request (5A) before or after transmitting the code request (1).

It is recognized that embodiments herein contemplate use with multiple computing devices 120 and trusted client devices 115. Consequently, the provisioning service 122 may receive numerous validation messages (4) and configuration requests (5A) continuously over time without any particular temporal alignment with one another. For example, the provisioning service 122 may receive a configuration request (5A) from a first computing device 120, while receiving a validation message (4) associated with an unrelated client device (e.g. corresponding with a different computing device). A validation message (4) corresponding to the first computing device 120 may be received at a later time, with no temporal alignment with the corresponding configuration request (5A).

To facilitate operation with temporally uncorrelated configuration request and authorization requests, the provisioning service 122 maintains a potential session list of validation messages and configuration requests. The potential session list may be stored in the data store 135 and repeatedly updated by the provisioning service 122 throughout operation. As new configuration requests and validation messages are received, they are added to the potential session list in the data store 135. Validation messages and configuration request are removed from the data store 135 in one of various manners.

For example, when a validation message is matched to a configuration request, such as in accordance with the operations hereafter in connection with FIGS. 4-7, the validation message and configuration request are removed from the potential session list. Additionally or alternatively, when a validation message remains on the potential session list (unmatched to a configuration request) for a predetermined period of time, the validation message may be removed from the potential session list. Similarly, when a configuration request remains on the potential session list (unmatched to a validation message) for a predetermined period of time, the configuration request may be removed from the potential session list. It is recognized that other manners of operation may be included as well to match, update and otherwise maintain configuration request and validation messages.

Upon receipt of a validation message (4) and a configuration request (5A) from a matching image/device, the provisioning service 122 provides configuration credentials (5B) to the matching image/computing device 120. The LSE 110 utilizes the configuration credentials (5B) to establish a secure network connection (6) with an identified gateway service 145. Through the secure network connection (6), the LSE 110 provides secure access through the gateway service 145 to secure resources 150.

Although FIGS. 1 and 2 illustrate an example in accordance with some embodiments, it will be understood that the present disclosure is not limited to such a configuration but is intended to encompass any configuration capable of carrying out the operations described herein. For example, although primarily discussed above with reference to a single authorization service 132, provisioning service 122 and a single online resource 150, some embodiments may include a plurality of distributed network elements that collectively perform the operations described herein to provide for passwordless authentication of a CSA using a secure environment. Likewise, it will be understood that the operations performed by the online resources 150, gateway service 145 and the authorization server 134 may be performed by a single entity in some embodiments or different entities'. More generally, various functionality described herein with reference to separate functional elements may be combined within a single functional element and, vice versa, functionality described herein in single functional elements can be carried out by a plurality of separate functional elements.

Figure 3A:
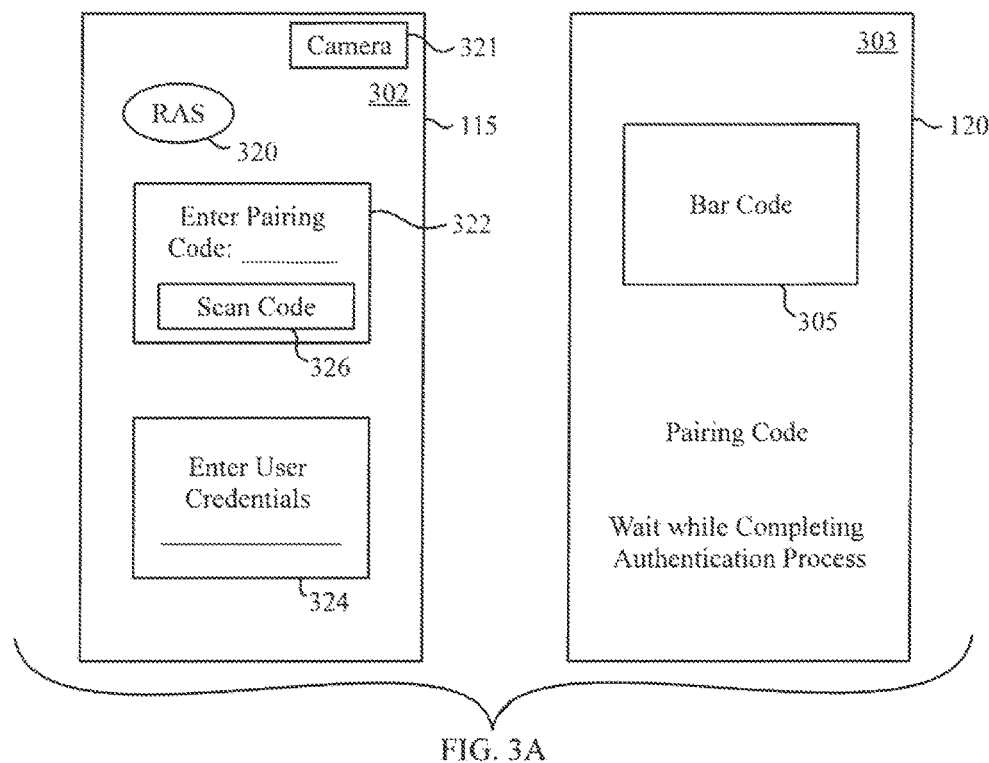
FIG. 3A illustrates a graphical representation of displays that may be presented on the trusted client device and computing device during an authorization and provisioning process in accordance with embodiments herein.

FIG. 3A illustrates a graphical representation of a display 302 that may be presented on the trusted client device 115 during an authorization and provisioning process in accordance with embodiments herein. The display 302 may be touch sensitive. The display 302 presents, among other things, a remote access session icon 320. When the user selects the icon 320, the provisioning application 117 (FIG. 2) directs the client device 115 to present one or more windows 322 and 324 (presented at the same time or serially). Window 322 prompts the user to enter the pairing code that is presented to the user on the computing device 120 (FIG. 1). The window 322 also presents an additional scan code icon 326. When the icon 326 is selected, the provisioning application 117 uses a digital camera, Bluetooth transceiver, or other data input within the client device 115 to scan a QR code and/or record audio/video/image information including a pairing code. The window 324 prompts the user to enter his or her credentials, such as ID and password.

The trusted client device 115 also includes a digital camera 321, such as in most portable electronic devices. The digital camera 321 includes, among other things, a lens or other input device, a digital sensor and circuitry to process images and video captured by the digital sensor and to perform various digital imaging operations. For example, the camera 321 may capture still and video images, scan the barcode 305, etc.

FIG. 3A further illustrates a display 303 for the computing device 120. The display 303 presents a pairing code 305 which may represent a barcode to be scanned by the trusted client device 115. The pairing code 305 may be continuously displayed until the authentication and provisioning operations described herein are completed. While the pairing code 305 is displayed, a status message may be presented to the user, such as "Wait While Completing Authorization Process".

Figure 3B:
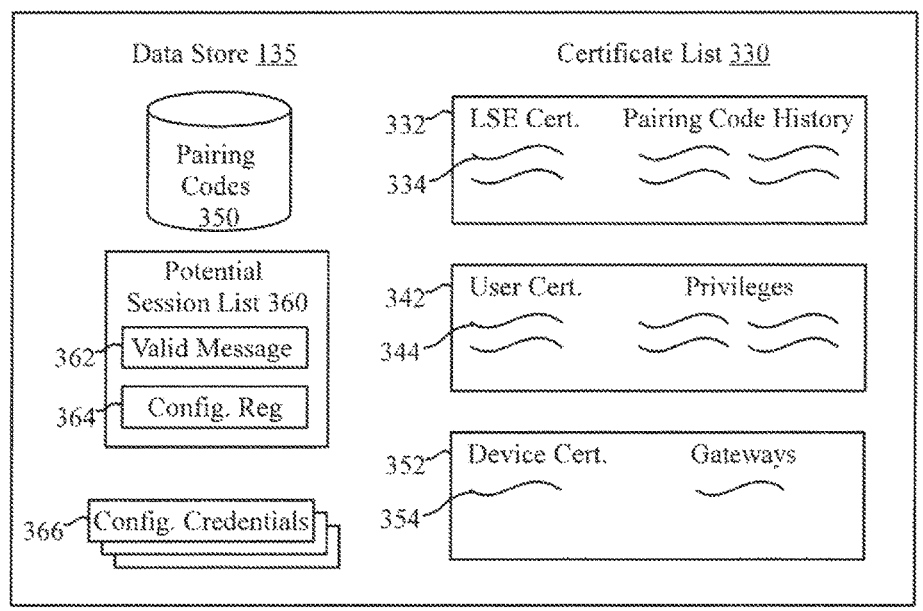
FIG. 3B illustrates a block diagram of at least a portion of a data store formed in accordance with embodiments herein.

FIG. 3B illustrates a block diagram of at least a portion of the data store 135 (FIGS. 1 and 2) formed in accordance with embodiments herein. The data store 135 stores, among other things, a certificate list 330 that includes certificates in connection with LSE images, users, trusted client devices and the like. The certificate list 330 includes a list of image certificates 332 that includes one or more image certificates 334 that are uniquely associated with the corresponding LSE images. As one example, an image certificate 334 may represent a pairing code provided as explained herein. Additionally, the image certificate may include a serial number or other unique ID associated with an LSE image in addition to a pairing code. In accordance with some embodiments, at least a portion of an image certificate 334 (e.g., software serial number and version) is created at the time that a corresponding LSE image is created (e.g. stored to an individual portable data store 105). The image certificate 334 is also stored with the LSE image at the time created on the PDS 115.

Optionally, the pairing code may be pre-stored in the image certificate 334. When the pairing code is generated at run-time (during a pairing operation) the pairing code is added to the image certificate 334 by the provisioning service.

The list of image certificates 332 may also include additional information, such as various content and history information. For example, the content may include additional information about the user, computing device, LSE image, as well as information identifying potential gateways 145 that may be used with the LSE image, resources 150 that the user is authorized to use and the like. The history information may correspond to the amount of time or number of uses that an individual LSE image has been used, such as in order to determine when to deactivate an LSE image. The history information may also include tracking information and cookies associated with past secure remote access sessions of a user.

The certificate list 330 also includes a list of user certificates 342 that includes one or more user certificates 344 uniquely associated with one or more corresponding authorized users. A user certificate 344 may represent a user ID and/or password associated with an individual user. The user certificate 344 may be created at the time that a user account is initiated and may be updated throughout the life of a user account (e.g. throughout a CSA's employment). The certificate list 330 may also include additional content related to a user, such as a user profile, user preferences, tracking information. The user content may also identify potential gateways 145 that may be used by the user, as well as resources 150 that the user is authorized to use.

Additionally or alternatively, the certificate list 330 includes a list of trusted client device certificates 352 that includes one or more client device certificates 354 uniquely corresponding to individual trusted client devices 115. Device certificates 352 may be generated when a trusted client device is assigned to a user and/or throughout operation, such as in connection with the polling request, authorization request and/or remote access session. The image, user and device certificates may be updated throughout use, such as in connection with the secure remote access session, the time a new LSE image is used or downloaded and the like.

Additionally or alternatively, the data store 135 may also maintain one or more pairing codes 350 separate from the certificate list 330. Pairing codes 350 can be generated in various manners, such as after the LSE image is created. For example, an LSE image may randomly generate a pairing code and pass the pairing code through the network 140 (FIG. 1) to the provisioning service 122. The provisioning service 122 then stores the pairing code in the data store 135, in the pairing codes 350 or in an image certificate 332 (when present and matched). As yet another example, in connection with FIG. 2, the provisioning service 122 may generate a pairing code as a return code (2) in response to a code request (1). When the provisioning service 122 generates the pairing code (2), the provisioning service 122 also stores the pairing code in the data store 135.

The pairing codes 350 may be stored alone, or alternatively stored with additional information related to one or more of an LSE image, user, computing device or trusted client device. For example, the pairing code 350 may be stored with a serial number or other unique identifier, an IP address or other information uniquely identifying an LSE image, computing device and/or trusted client device.

The data store 135 further includes a potential session list 360 of validation messages 362 and configuration requests 364. As explained herein, the provisioning service 122 continuously updates the potential session list 360 and attempts to match validation messages 362 to corresponding configuration requests 364. Matches between validation messages 362 and configuration request 364 may be achieved in various manners, such as by comparing one or more known common types of information (e.g. image ID, user ID, IP address, etc.).

The data store 135 further includes multiple sets of configuration credentials 366 to be used in connection with various LSE images and gateways. For example, a set of configuration credentials 366 associated with an individual gateway service 145 may include the IP address and other identifying information for the corresponding gateway service 145. The set of configuration credentials 366 may also identify the nature or type of the gateway service 145 (e.g. a VPN, a terminal server). Given that various types of gateway services 145 may be available, different sets of configuration credentials 366 may be stored in the data store 135 in connection with the type of gateway service 145.

As a further example, different sets of the configuration credentials 366 may be provided for different types of LSE images 110. For example, an LSE 110 that represents one type of operating system, may utilize one type of configuration credentials 366, while an LSE 110 that represents a web browser may utilize a different type of configuration credentials 366. Similarly, LSE images 110 that are intended to provide a VPN type of secure network connection may receive one set of configuration credentials, while another LSE 110 intended to operate as a remote desktop protocol (RDP) client may receive a different set of configuration credentials. The configuration credentials may include software snippets, libraries, modules or otherwise needed for the LSE image to establish a secure remote access session.

Authenticating and Provisioning Process

Figure 4A:
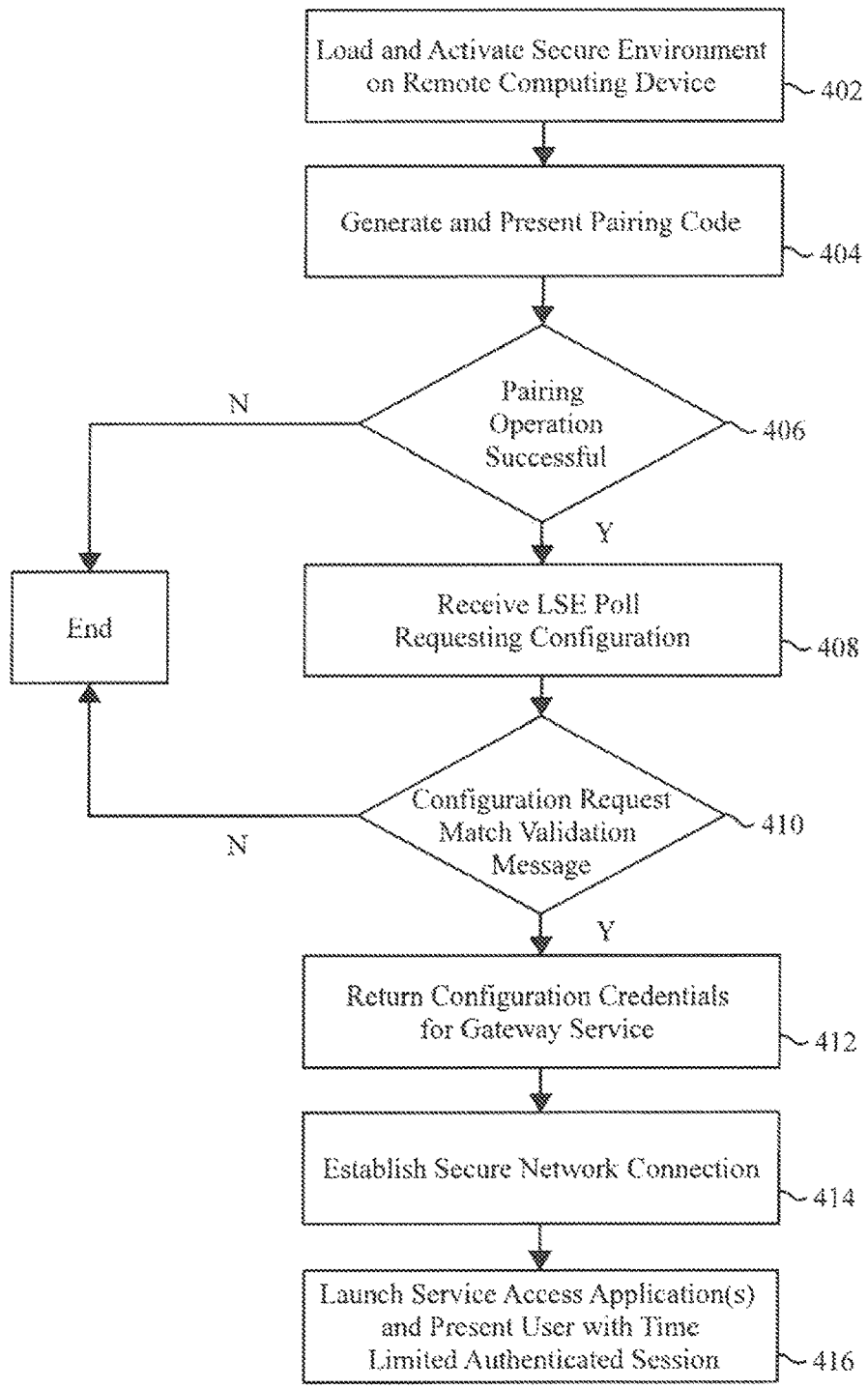
FIG. 4A illustrates a process for authenticating and provisioning a remote computing device in accordance with embodiments herein.

FIG. 4A illustrates a process for authentications and provisioning a remote computing device in accordance with embodiments herein. At 402, the authentication server 134 causes the LSE 110 to be provided on a portable data store 105. For example, the authentication server 134 may do so by directly or indirectly managing storage of LSEs 110 on portable data stores 105. Additionally or alternatively, the authentication server 134 may do so by merely storing information in the data store 135 related to an LSE 110 and PDS 105, such as saving data to the certification list 330

(FIG. 3B) in connection with one or more particular LSE 110. The PDS 105 is configured to be removably coupled to the computing device while utilizing the limited use secure environment 110 to establish the secure network connection. The LSE 110 is loaded onto a remote computing device 120 (FIG. 1) and activated. For example, the LSE 110 may be loaded from a CD ROM, a flash drive, or other storage medium. The LSE 110 is activated, such as by booting up a limited use operating system, opening an application and the like.

At 404, a pairing code is generated and presented to the user. For example, the pairing code may be generated by the LSE 110 when activated. For example, the LSE 110 may read a predetermined pairing code from a data store within the LSE 110. Alternatively, the LSE 110 may randomly generate the pairing code in real time, such as through the use of a random number generator. A seed or other initial information may be used in connection with randomly generating the pairing code.

When the LSE 110 is loaded with a predetermined pairing code, a matching pairing code may also be stored at the data store 135 (FIG. 1) when the LSE 110 is stored on the PDS 105. Additionally or alternatively, the LSE 110 may convey the pairing code, whether pre-stored or randomly generated, over the network 140 (FIG. 1) to the provisioning service 122. When the pairing code is provided over the network 140 to the provisioning service 122, the pairing code is uploaded to the data store 135 for subsequent use in authentication and validation.

The pairing code may be presented to the user in various manners. For example, the pairing code may be presented as a quick response (QR) code, or alphanumeric character string or both. A quick response code may represent a 2 or 3 dimensional barcode that may be scanned by a barcode reader (in the trusted client device 115), where the quick response code includes unique identification information. When a QR code is used, the QR code may be presented on the display of the computing device 120 (FIG. 1), and the client device 115, such as a smart phone, may be used to scan the QR code. For example, the pairing code may be presented as an alphanumeric character string on the display of the computing device. Alternatively, the pairing code may be presented as (or within) an audio message and/or a video message.

At 406, a pairing operation is performed between the computing device 120, trusted client device 115, and authentication server 134. The authentication server 134 performs the pairing operation based on the authentication request that includes the environment credential and user credential. The environment credential associated with an LSE 110 (e.g., is uniquely allocated to a select LSE). The pairing operation may be performed in accordance with various processes described herein and utilize various separate credential sources as explained herein, such as in connection with FIGS. 5 and 7. When the pairing operation is not successful or times out without successfully completing, the process ends. When the pairing operation is successfully completed, flow advances to 408. With reference to the configurations of FIGS. 1-3, when the pairing operation is successful, the authorization service 132 passes a validation message to the provisioning service 122 to indicate that a valid authorization request has been received. The validation message includes, among other things, identification information for the computing device 120, LSE image and/or user. The provisioning service 122 maintains a potential session list of validation messages corresponding to computing devices, users and LSE images that have been recently validated by the authorization service 132. When validation messages become "stale" (e.g. a predetermined period of time has passed without receiving a corresponding configuration request), the provisioning service 122 removes the validation message from the potential session list. Similarly, when a validation message is matched to a configuration request, the validation message is removed from the potential session list. Hence, a validation message is maintained on the potential session list for a single matching cycle. The next time that the computing device and LSE image seek to obtain a network connection, the computing device and LSE image will need to repeat the authorization process.

At 408, the LSE 110 performs a polling operation to request configuration credentials to be used in connection with establishing a secure network connection with the gateway service 145 (FIG. 2). For example, the LSE 110 may direct the computing device 120 to send one or more configuration requests (5A) (FIG. 2) over the network 140 to the provisioning service 122. The configuration request (5A) may include various information, such as identification information for the LSE image, a version number for the LSE image, a Mac address or IP address associated with the computing device 120, identification information for the computing device and the like. For example, the configuration request (5A) may include information indicating that the LSE image represents a certain version of a limited use LINUX operating system, a version of a limited use Web server of a select type (e.g., Chrome, Safari, etc.), a version and type of operating system of the computing device, as well as other information of interest to the provisioning service 122. In addition, the configuration request (5A) may indicate the creation date, past use history, remaining life and other information regarding the LSE 110. The provisioning service 122 records the information in the polling request and uses the information for various actions, such as to determine which configuration credentials are appropriate/necessary for the computing device 120 and LSE 110 to establish a secure connection with the gateway service 145.

While the example of FIG. 4A illustrates the operation at 408 to follow the operations at 402-406, it is understood that the polling operation at 408 may be performed iteratively and periodically at any time before, during or after any of the operations of FIG. 4.

At 410, the provisioning service 122 compares one or more incoming configuration requests (5A) with the validation message(s) saved on the potential session list to identify matches there between. For example, the provisioning service 122 may compare LSE image identification information with identification information from the validation messages. When no match occurs, various actions may be taken. For example, the provisioning service 122 may terminate the present attempted pairing operation. Alternatively, the provisioning service 122 may maintain the configuration request for a select period of time, during which the potential session list is intermittently searched again for a matching LSE image. When a match is identified, flow moves to 412.

At 412, the provisioning gateway service returns configuration credentials to be used by the LSE 110 to configure the computing device 120 in a manner that will enable the LSE 110 image to establish a secure network connection with the gateway service 145. For example, the gateway configuration credentials may include the IP address and other identifying information for the gateway service 145, the nature or type of the gateway service 145 (e.g. a VPN, a terminal server), a temporary session ID and password, encryption information, encryption keys, and the like. The gateway configuration credentials include short lived machine credentials that are only valid for a limited period of time, single session, or set number of sessions to access a secure network. For example, the short-lived machine credentials enable the computing device 120 to establish a secure network connection, such as through a VPN with the gateway service 145.

The gateway configuration credentials also include short lived user credentials that can be used to access a secure service or resource for a limited period of time, a single session, or a set number of sessions. The short-lived user credentials may include a browser cookie. For example, the browser cookie may represent a small text file with ID tags that are stored on a browser directory or program data subfolders of the computing device 120. The cookies may be used when visits a website associated with a resource 150 that uses cookies to keep track of movements within the resource 150, help the customer service agent resume where they left off, remember the customer service agent registered login, theme selection, preferences, and other customization functions. For example, the cookie may include the URL of the resource 150, the duration of the cookie's abilities and effects, and a random number. The provisioning service 122 may store a cookie file (with the same ID tag) corresponding to the cookie(s) sent with the gateway configuration credentials to be used in the browser of the computing device 120. The provisioning service 122 may update the cookies for the session in which the CSA logs in, and provide the updated cookies with new set of gateway configuration credentials. The cookies provided as part of the configuration credentials may track and keep information regarding a customer service agents movements within a site or resource 150 and any information voluntarily given while the customer service agent visits the website associated with the resource 150.

During or at the completion of a remote access session, the resource 150 or LSE 110 may provide any new or updated cookie information to the provisioning service 122. The provisioning service 122 updates the cookies associated with a user account and/or LSE image in the data stores 135 for use in the next remote access session.

As further examples, the gateway configuration credentials may also include a temporary client ID and password to be used by the computing device 120 and the LSE 110 during an individual remote access section. When the secure network connection utilizes encryption, the gateway configuration credentials may include all or a portion of the encryption software applications needed to operate on the computing device, and/or encryption keys or other encryption related information.

At 414, the computing device and the LSE image upload the gateway configuration credentials, perform any configuration related actions and initiate communication with the gateway server 145 to establish the secure network connection. For example, the operations at 402-412 may be performed at an intermediate point during a booting process for the LSE image. The LSE 110 may suspend the booting process until receiving the gateway configuration credentials. Thereafter, the computing device may continue a booting process, establish the secure network connection with the gateway service 145.

At 416, the computing device and the LSE image launch a remote access application and present the user with a time limited but authenticated, secure remote access session to interact with one or more resources 150. For example, when the user represents a customer service agent, the resources 150 may relate to the job responsibilities and functions of the customer service agent, while the secure session is maintained for a predetermined period of time related to the customer service agent's responsibilities. For example, the secure remote access remote access session may be available for an individual shift assigned to the customer service agent, for a number of shifts for the customer service agent, for some other predetermined period of time, for limited hours of use, for a limited number of uses and the like.

Figure 4B:
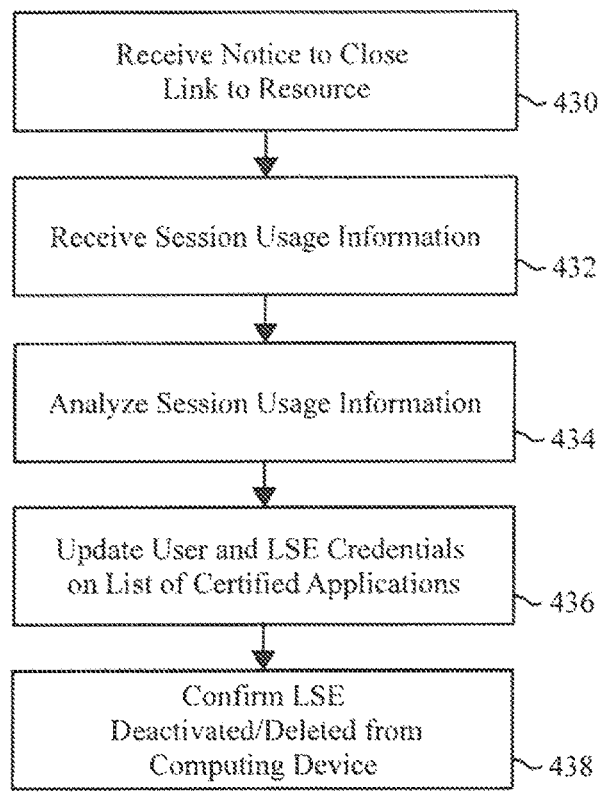
FIG. 4B illustrates a process for terminating a remote access session in accordance with embodiments herein.

FIG. 4B illustrates a process for terminating a remote access session in accordance with embodiments herein. At 430, a notice is received (such as at the provisioning service 122 or gateway service 145) to close the link to a resource 150 or otherwise end a remote access session with the resource 150. For example, the notice may represent an indication that a user has logged off, closed an Internet browser or otherwise closed/deactivated an application communicating with the resource 150. At 432, the provisioning service 122 receives session usage information, such as the duration of the remote access session and other information regarding the nature of the actions taken during the remote access session. As one example, the session usage information may include tracking data indicative of actions taken by the user, as well as actions attempted by the user that were denied by the LSE 110. For example, a user may attempt to perform a print screen operation, open an email account, perform a print operation or take another action that is unauthorized within the LSE 110. The LSE 110 may collect tracking data indicating such attempts and provide the tracking data to the provisioning service 122.

At 434, the provisioning service 122 analyzes the session usage information. For example, the provisioning service 122 may analyze the tracking data to determine various corrective actions. For example, the provisioning service 122 may determine that certain errors occurred or that additional functionality is needed or warranted within the LSE 110 to enable the user to perform certain job functions. In this example, a subsequent version of the LSE 110 may provide the user with added functionality. Alternatively, when the provisioning service 122 determines that a user has repeatedly attempted to perform unauthorized actions that are not warranted in connection with legitimate job functions, the provisioning service 122 may take appropriate actions. For example, the provisioning service 122 may provide a warning or other notification to the user to cease attempting to perform such unauthorized actions, may notify appropriate system management personnel, or may deactivate the LSE image prematurely (e.g. before the normal intended life initially defined for the LSE image).

At 436, the provisioning service 122 updates the user credentials and/or the environment credentials based on the analysis of the session usage information. For example, the provisioning service 122 may update the application/environment certificate associated with the LSE image to update the number of hours utilized in connection with remote access sessions. The provisioning service 122 may update the number of remote access sessions and the like. The provisioning service 122 may update tracking information, such as cookies or other data, related to the application/environment. As a further example, the provisioning service 122 may determine that the LSE has exhausted a predetermined available lifespan, such as when the LSE is used for the predetermined period of time, completes a single remote access session, completes a set (e.g. maximum) number of remote access sessions or otherwise. When an LSE has completed or exhausted the predetermined available lifespan, operations are performed to cause the limited use secure environment to become disabled. For example, the provisioning service 122 may remove or disable the application/environment certificate from the certified list of approved or certified images such that the next time the LSE 110 requests authentication, the request will be denied. Additionally or alternatively, the LSE 110 may self-deactivate or self-disable based on predetermined criteria (e.g., a predetermined available lifespan, such as when the LSE is used for the predetermined period of time, completes a single remote access session, completes a set (e.g. maximum) number of remote access sessions or otherwise). The LSE 110 may deactivate/disable based on pre-stored instructions and/or in response to a direction from the provisioning service 122.

At 438, the process confirms that the LSE 110 is either deleted or disabled on the computing device 120. The delete/disable confirmation may be partially or wholly performed at the computing device 120, at the trusted client device 115, and/or by the provisioning service 122. As an example, the LSE may direct the computing device 120 to delete or disable the LSE 110, upon the completion (and confirmation) of which, a closing script or other action directs the computing device 122 to convey a message to the provisioning service 120 indicating that the LSE has been properly deleted/disabled. As another example, the trusted client device 115 may communicate with the computing device 120 and/or the portable data store 105 (e.g. through Bluetooth, BLE or some other near field communications medium) to confirm that the LSE has been properly deleted/disabled. As another example, the provisioning service 122 may convey an instruction to delete/disable the LSE 110 to the computing device 120. Additionally or alternatively, the provisioning service 122 may convey a delete confirmation request to the computing device 120, where a response from the computing device 120 confirms that the LSE 110 has been deleted/disabled.

The operation at 438 confirms that the LSE 110 is removed from the computing device 120 to prevent malicious third-party attacks upon the LSE 110, such as in an attempt to circumvent security measures therein and for other unauthorized reasons.

Additionally or alternatively, when a new LSE 110 is loaded onto the computing device 120, the new LSE 110 may search the computing device 120 for old LSEs. When an old LSE is identified on the computing device, the new LSE 110 may perform various analysis and diagnostics to determine whether the old LSE image should appear on the computing device (e.g. when merely disabling an old LSE, without entirely deleting the image). The analysis and diagnostics may further determine whether the old LSE has been tampered with, such as through third-party attacks. In the event that an old LSE is identified, and the LSE exhibits proof of tampering, the new LSE may discontinue booting and take other appropriate action. For example, the new LSE may record identification information for the computing device 120 and place the computing device on a blacklist, with which the portable data store 105 will never operate again. Thereafter, when the portable data store 105 is plugged into a computing device 120 on the blacklist, the LSE simply denies the booting operation. As another example, the new LSE may "self-destruct", by deleting itself from the portable data store 105 or otherwise scrambling the code of the LSE.

While the operations described in connection with FIG. 4B are discussed in connection with termination or completion of a remote access session, it is recognized that at least a portion of the operations of FIG. 4B may be performed at other times. For example, the operations at 438 may be performed at the beginning of a remote access session.

Figure 5:
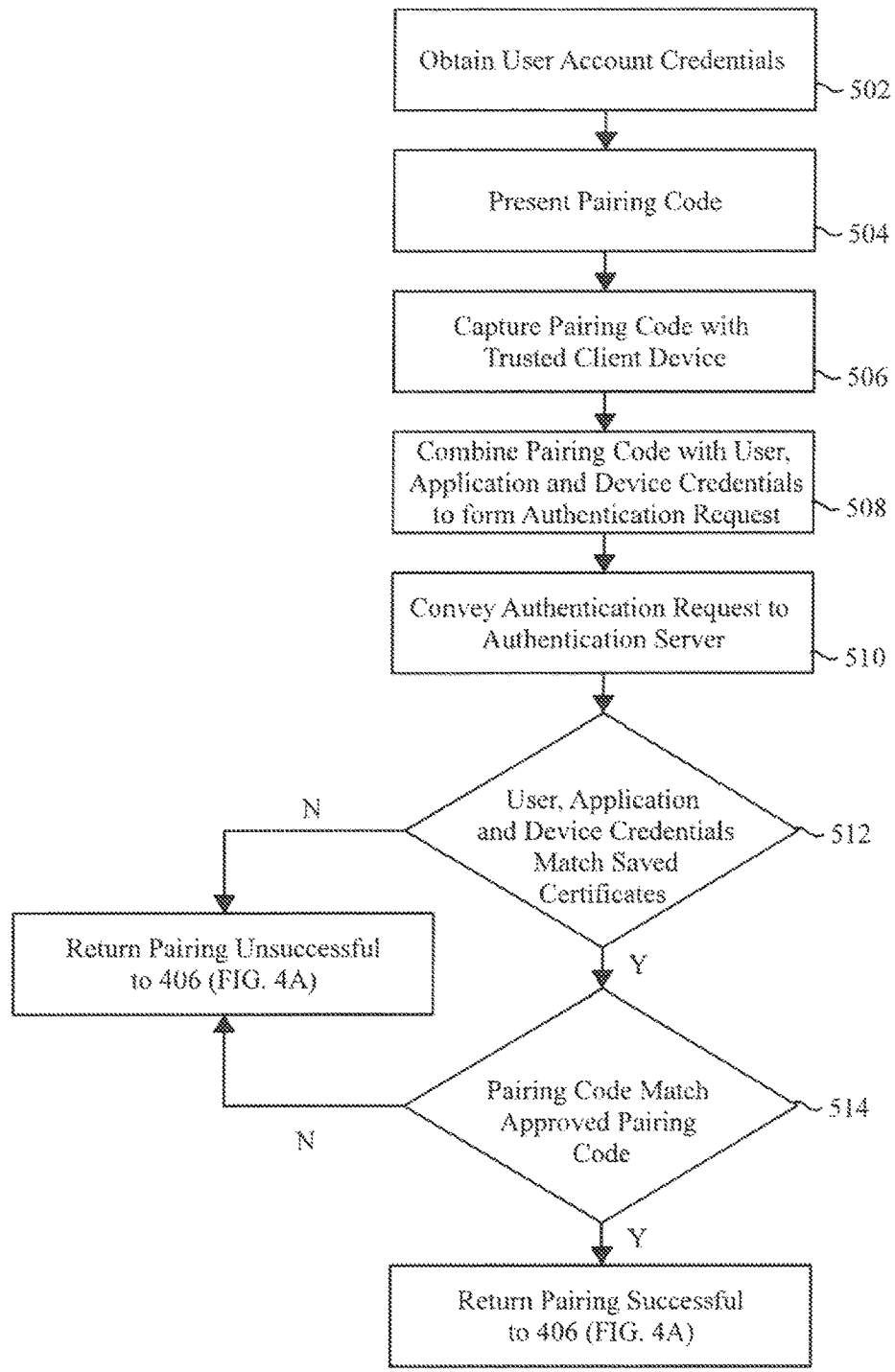
FIG. 5 illustrates a process for performing a pairing operation in accordance with embodiments herein.

FIG. 5 illustrates a process for performing a pairing operation in accordance with embodiments herein. The operations of FIG. 5 may be performed at 404 and 406 in FIG. 4A. The operations of FIG. 5 may be performed in whole or in part by one or more processors within, or distributed between, the computing device 120, a trusted client device 115 (e.g. a smart phone) and/or the authentication server 134. Beginning at 502, user account credentials are obtained. For example, the user account credentials may include a user ID and password entered by the user on one or more of the computing device 120 and trusted client device 115. The user account credentials may be manually entered when the user wishes to initiate a remote access session. Alternatively, the user account credentials may be securely stored on the trusted client device 115 (and in certain circumstances on the computing device 120).

At 504, a pairing code is presented to the user. For example, the pairing code may represent a QR code, or alphanumeric string displayed on the computing device 120. Additionally or alternatively, the pairing code may include one or more of a video, an audio message, an image and the like presented by the computing device 120, visually and/or audibly.

At 506, the trusted client device 115 captures the pairing code. For example, when the pairing code includes a QR code, an alphanumeric string, an image or video, the client device 115 may perform a barcode scan of the QR code, take a picture of an alphanumeric string or an image, record the video, record the audio message, or a combination thereof.

At 508, the trusted client device 115 combines the pairing code with the user account credentials, and optionally with additional credentials unique to the trusted client device 115. For example, the client device 115 may be operating a provisioning application that includes application credentials (e.g., serial number or other unique identifier) unique to the application. The client device 115 may also have assigned thereto client device credentials (e.g., serial number or other unique identifier). The credentials assigned to the provisioning application 117 and client device 115 may be saved in a secure certificate store on the client device 115. The provisioning application 117 combines the pairing code with one or more of the user credentials, application credentials and device credentials to form an authentication request.

At 510, the trusted client device 115 conveys the authentication request to the authentication server 134. The authorization request may be conveyed over various channels, such as over a data or voice channel maintained over a cellular communications network. For example, the authentication request may be conveyed in a text message or as a network communications message conveyed to a predetermined Mac or IP address.

At 512, the authorization service 132 receives the authentication request, identifies the various credentials and other information within the authorization request and attempts a verification operation. For example, the authorization service 132 compares the user credentials with a list of user certificates 332 (FIG. 3B) the application credentials with a list of application certificates 342 and optionally compares the device credentials to a list of device certificates 352. When the incoming user, application and device credentials match to previously stored user, application and device certificates, the authorization request is verified to originate from an authorized user, client device and application.

Optionally, one or more of the user, application and device credentials may be omitted from the authorization request and omitted from the matching operation at 512. For example, it may be desirable to perform a client device agnostic authorization, wherein the device certificated are omitted, and the operation at 512 merely seek to match user and application credentials with previously stored counterpart certificates. Alternatively, when it is desirable to perform an application agnostic authorization, but in connection with a particular client device assigned to a particular user, the application credentials may be omitted from the authorization request and operation at 512 merely seek to match user and device credentials with previously stored counterpart certificates.

When the credentials are determined to match at 512, flow moves to 514. Otherwise, the operation ends. At 514, the authorization service 132 performs a code matching operation between the pairing code within the authorization request and previously approved pairing codes 350 (or in image certificates 334) (FIG. 3B) in data store 135. The previously approved pairing codes may be stored at the time the LSE is created. Alternatively, the authorization service 132 may compare an incoming pairing code with recent codes stored in the data store 135 by the provisioning service 122 in connection with code request (1) and/or return codes (2). When a match is identified between a pairing code incoming through an authorization request and an approved pairing code 350, the pairing operation is declared successful. When no match occurs between the incoming pairing codes and previously stored or approved pairing codes, the process terminates with an indication that pairing was unsuccessful.

Optionally, the order of the operations in FIG. 5 may be varied and one or more of the comparisons may be omitted. The process of FIG. 5 provides a high degree of confidence that a request is coming from a trusted source by comparing various types of information received from more than one source, namely a computing device and a trusted client device, over separate communications paths. The various credentials and codes utilized in FIG. 5 limit the amount of information or actions requested from the user to provide a streamlined authentication process.

Figure 6:
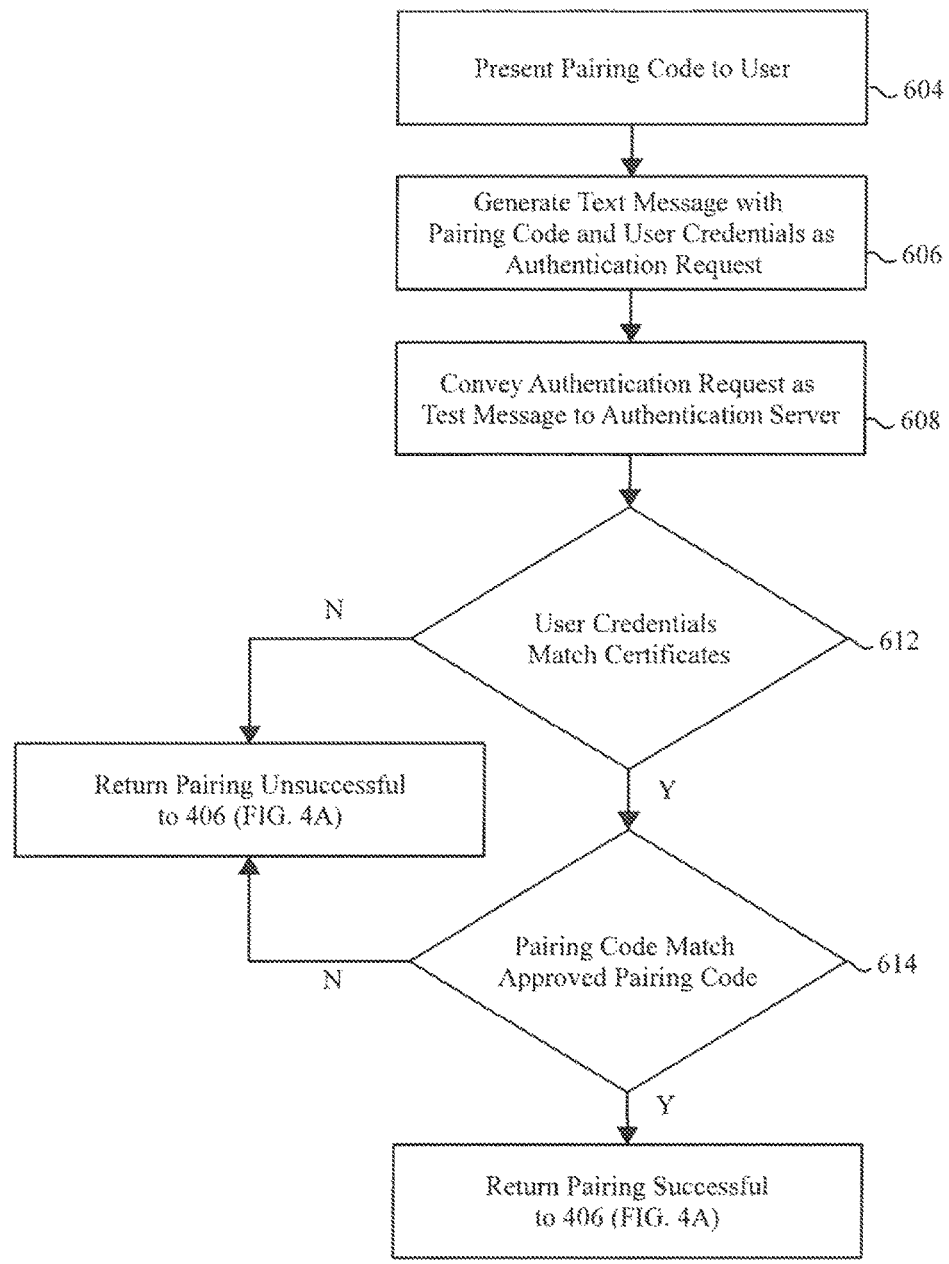
FIG. 6 illustrates a process for performing a pairing operation in accordance with alternative embodiments herein.

FIG. 6 illustrates a process for performing a pairing operation in accordance with alternative embodiments herein. The operations of FIG. 6 may be performed at 404 and 406 in FIG. 4. The operations of FIG. 6 may be performed in whole or in part by one or more processors within, or distributed between, the computing device 120, a trusted client device 115 (e.g. a smart phone) and/or the authentication server 134.

At 604 a pairing code is presented to the user. For example, the pairing code may represent an alphanumeric string displayed on the computing device 120. Additionally or alternatively, the pairing code may include one or more of a video, an audio message, an image and the like presented by the computing device 120, visually and/or audibly.

At 606, the user enters, at the trusted client device 115, the pairing code. For example, the user may enter the pairing code into a text message through the alphanumeric interface on a smart phone, by stating the pairing code to the smart phone while in a listen mode and the like. At 606, the user also enters user account credentials, such as a user ID, password, pin, passphrase and the like. The pairing code and user account credentials are entered into a common text message.

At 608, the trusted client device 115 conveys the pairing code in combination with the user account credentials as the authentication request in a text message to the authentication server 608. The authentication request is conveyed over a text messaging channel.

At 612, the authorization service 132 receives the authentication request, identifies the credentials and codes within the authorization request and attempts a verification operation. For example, the authorization service 132 compares the user credentials with a list of user certificates. When the incoming user credentials match a previously stored user certificate, the authorization request is verified as coming from an authorized user. By utilizing text messaging, embodiments herein may afford a mechanism to present an authorization channel that is client device agnostic and does not utilize a provisioning application. Alternatively, device identification information within the text message may be utilized as device credentials and compared at 612 to device certificates as an additional qualification before approving a request.

When the credentials are determined to match at 612, flow moves to 614. Otherwise, the operation ends. At 614, the authorization service 132 performs a code matching operation between the pairing codes within the authorization request and previously approved pairing codes. When a match is identified between a pairing code incoming through an authorization request and an approved pairing code, the pairing operation is declared successful. When no match occurs between the incoming pairing code and previously stored or approved pairing codes, the process terminates with an indication that pairing was unsuccessful.

The process of FIG. 6 avoids the need for a separate provisioning application (such as application 117) by enabling the user to enter the pairing code and any other credentials through a common data entry mechanism in most portable and desktop electronic devices.

Additionally or alternatively, the pairing operation may be performed utilizing cellular or traditional telephone networks. For example, with reference to FIG. 6, the user may be presented with the pairing code (e.g. at 604). The user may then initiate a phone call (e.g. to an 800 number) and enter the pairing code along with user credentials as an authorization request (similar to the operation at 606, but without the use of text messaging). Thereafter, the authorization request entered by the user through the 800 number is conveyed to the authentication server. The user credentials entered by the user through the 800 number are compared to user certifies and the pairing code entered by the user through the 800 number is attempted to be matched to approved pairing codes. When the user credentials and pairing codes match, a successful pairing operation is declared. Otherwise unsuccessful pairing operation is declared.

Figure 7:
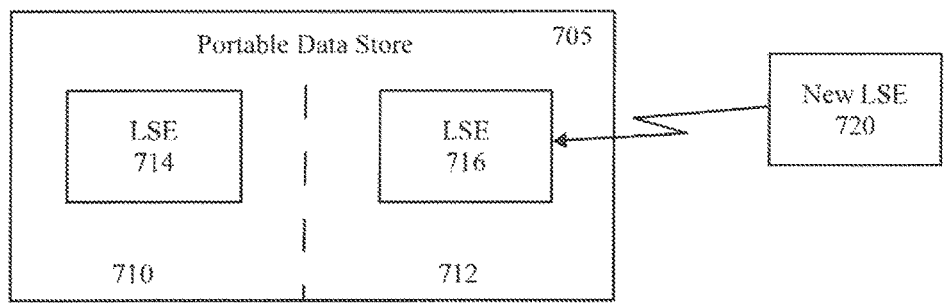
FIG. 7 illustrates a block diagram of a portable data store formed in accordance with an alternative embodiment.

FIG. 7 illustrates a block diagram of a portable data store 705 formed in accordance with an alternative embodiment. The portable data store 705 is configured to support remote updates. By way of example, the data store 705 may represent a USB flash drive or other storage medium that may be rewritten. The data store 705 is partitioned into at least first and second storage partitions 710 and 712, each partition of which is configured to store a separate standalone LSE 714, 716. The LSEs 714, 716 may generally resemble one another, but be different versions of a common base LSE. The storage partitions 710, 712 are individually designated to have read only and write modes. In accordance with embodiments herein, the methods and systems alternately designate one or the other of the storage partitions 710, 712 an active partition. The computing device uses the LSE in the active one of the storage partitions 710, 712 for a booting operation in order to launch a select limited use LSE 110.

When one of the LSEs, such as the LSE 714 from the storage partition 710 is being utilized by the computing device to maintain a secure session, the active storage partition 710 is set in a "read only" mode, and the other storage partition 712 is set in a "write" or overwritten mode. When the storage partition 712 is set in the right mode, the LSE 716 may be replaced or otherwise updated with a new LSE 720. Accordingly, updates may be performed by overwriting the in-active or opposite storage partition 712.

When the current secure session ends and, at a later date, a new session began, the new LSE 720 is accessed by the computing device and used to launch the next secure session. At that time, the storage partitions 712 containing the new LSE 720 is set in an "read only" mode, while the storage partition 710 having the previously used LSE 714 is switched to the right or overwrite mode, in order to load update or a new LSE in place of LSE 714. The process iteratively flips between the storage partitions between subsequent booting operations.

Optionally, the time one of the LSEs 714, 716 is loaded, the computing device and/or authorization server 134) may determine whether the LSEs 714, 716 represent the current version. When a current version is not stored on the data store 705, a new version of the LSE may be downloaded to the unused storage partition 710, 712.

Figure 8:
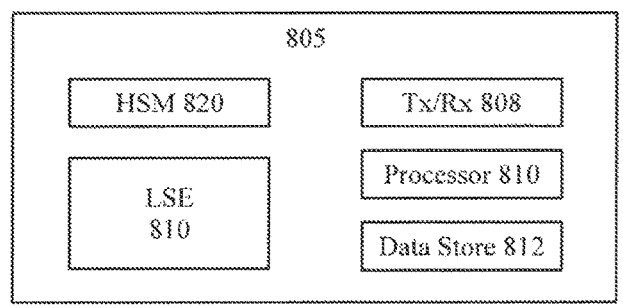
FIG. 8 illustrates a portable data store formed in accordance with an alternative embodiment.

FIG. 8 illustrates a portable data store 805 formed in accordance with an alternative embodiment. The data store 805 includes an image 810 that operates in a same manner as the LSEs 110 described herein. In addition, the data store 805 includes additional components to communicate with the trusted client device, such as a trusted smart phone. For example, the data store 805 may include a transceiver 808, a processor 810 and a data store 812. The transceiver 808 may support various types of communications with a trusted client device, such as through a Bluetooth connection, a Bluetooth low energy connection, a Wi-Fi connection, ZigBee connection, speaker/microphone, any near field communications medium and the like. The processor 810 manages communication via the transceiver 808 with a trusted client device. For example, the processor 810 may convey the pairing code, as well as various device, user and application credentials to the trusted client device to be separately conveyed to the authorization server 134.

Optionally, the processor 810 may interact with the trusted client device to perform various audit operations of the content of the data store 805, including auditing the LSE to determine whether the LSE. The LSE may be audited for various reasons, such as to confirm that the LSE is properly stored on the data store 805, to determine whether the data store 805 has been infected with malware or other unauthorized content. The processor 810 may interact with the trusted client device to determine when and whether the LSE is properly loaded to the computing device. For example, the audit operation may include performing a checksum analysis upon the LSE while on the data storage and/or after loaded/booted by the computing device.

The data store 805 may also include a hardware security module (HSM) 820 that is configured to provide safeguards against an authorized access to the LSE 810. The hardware security module 810 represents a physical computing device (that may utilize the processor 810 or a different processor or controller) to safeguard the LSE against unauthorized copying. By way of example, the HSM 820 and trusted client device may utilize digital keys for strong authentication there between. The HSM 810 may also provide encryption processing in connection with various data and information, such as, but not limited to, the pairing codes, user credentials, device credentials an application credentials. The HSM 820 may be utilized to ensure that the LSEs only booted and activated by the customer service agent or other user authorized to do so (and having a particular trusted client device with digital keys stored thereon).

By way of example, a pairing code may be passed to the phone, where the pairing code includes a hash-based message authentication code (HMAC) which represents a message authentication code that utilizes a cryptographic key in conjunction with a hash function known to the trusted client device. When the trusted client device receives the pairing code, the trusted client device partitions out the HMAC and implements the corresponding decryption and hash function to verify that the incoming pairing code is from an authorized data store 805.

Alternatively, the HMAC may be passed from the trusted client device to the data store 805 to be decrypted by the processor 810 utilizing the appropriate hash function to confirm that the client device to which the data store 805 is communicating represents a trusted client device. In the foregoing example utilizing HMAC, the pairing operation is only continued upon confirmation that the HMAC matches for the data store 805 and trusted client device. Optionally, the trusted client device may retain multiple valid HMAC keys, corresponding to an equal number of valid data stores. Hence, an individual user need not be associated with a specific data store (and HMAC). Instead, a number of data stores (and HMACs) may be utilized by various users (having corresponding trusted client devices).

As explained herein, at the completion of an individual secure remote access session, the LSE is deleted, disabled or otherwise rendered non-functional on the computing device such that at the completion of the individual access session, the present instance of the LSE can no longer be used. Once a remote access session terminates, a new instance of the LSE should be loaded from the portable data store onto the computing device before the system is able to initiate a new cure remote access session. The terms "disabled" and "delete", as used in connection with the LSE, are used interchangeably throughout to refer to rendering the LSE in operative on the computing device. For example, the physical instance of the LSE may be erased from the memory of the computing device. Additionally or alternatively, the memory storing the physical instance of the LSE may be made available for other unrelated content to be written over the LSE. As another example, an LSE may be rendered in operative by deleting links to certain libraries or function calls or other content necessary to operate the LSE.

As yet a further example, all or portions of the LSE may remain solely on the portable data store at all times and never physically be copied to memory in the computing device (referred to herein as a PDS-based instance). In the example utilizing a PDS based an end of the LSE, the portions of (or the entire) LSE that remain on the portable data store operate from the portable data store throughout the remote access session. In the example of a PDS-based instance, when the LSE is booted up, the LSE operates entirely or partially from on the portable data store.

Closing

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device 510 (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and nonvolatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, as a result of execution by one or more processors of a computer system, cause the computer system to:
    receive a code request associated with a limited use operating system loaded onto a computing device, the limited use operating system configured to prevent unauthorized actions at the computing device while accessing a resource of interest via a gateway service over a secure network connection;
    generate a pairing code in response to the code request;
    receive an authentication request at an authorization server, the authentication request including the pairing code and a user credential, the pairing code associated with the limited use operating system, the user credential associated with a user of the computing device;
    validate the paring code and user credential from the authentication request at the authorization server;
    receive a polling request from the limited use operating system at the authentication server; and
    when the authentication request is validated, return configuration credentials from the authentication server in order for the computing device to establish a secure network connection through a gateway service with the resource of interest.

2. The non-transitory computer-readable storage medium of claim 1, wherein the validate operation performed by the authentication server confirms that the pairing code has been generated by the limited use operating system when the limited use operating system is activated on the computing device and that the pairing code has been presented to the user through the computing device.

3. The non-transitory computer readable storage medium of claim 1, wherein the generate operation includes generating a quick response code to be displayed on the computing device as the pairing code, wherein the authentication request includes the quick response code combined with the user credentials.

4. A computer implemented method for authenticating a remote access session, comprising:
    performing a pairing operation based on an authentication request that includes an environment credential and a user credential, the environment credential associated with a limited use secure environment that, when loaded onto a computing device, takes at least partial control of the computing device, and limits features available to the computing device while accessing a resource of interest, the user credential associated with a user of the computing device; and
    presenting configuration credentials to the limited use secure environment that enable the computing device to establish a secure network connection through a gateway service with the resource of interest.

5. The method of claim 4, further comprising causing the limited use secure environment to be provided on a portable data store to be removably coupled to the computing device while utilizing the limited use secure environment to establish the secure network connection.

6. The method of claim 4, wherein the pairing operation comprises:
    receiving, at an authorization service, the authentication request from a trusted client device, the authentication request including the user credential and the environment credential, the environment credential including a pairing code; and
    determining, at the authorization service, whether the pairing code and user credential match an approved pairing code and approved user certificate.

7. The method of claim 4, further comprising causing the limited use secure environment to randomly generate a pairing code as the environment credential when the limited use secure environment is activated on the computing device.

8. The method of claim 4, further comprising:
    receiving a code request, at a provisioning service, from the limited use secure environment on the computing device; and
    returning a pairing code from the provisioning service in response to the code request, the pairing code representing at least a portion of the environment credential.

9. The method of claim 4, further comprising:
    providing a quick response code to be presented at the computing device as at least a portion of the environment credential; and
    receiving the authorization request from a trusted client device, wherein the environment credential associated with the quick response code as scanned by the trusted client device.

10. The method of claim 4, further comprising receiving the authentication request as at least one of a text message, email, cellular data content, or telephone message.

11. The method of claim 4, further comprising causing the limited use secure environment to become disabled after at least one of a predetermined period of time and a predetermined number of uses.

12. The method of claim 4, wherein the limited use secure environment disables functions of the computing device including at least one of i) a print function, ii) a print screen function, iii) an email function, iv) an administrative function and v) access to select websites.

13. The method of claim 4, further comprising maintaining first and second limited use secure environments on a portable data store, wherein, while the first limited use secure environment is operating on the computing device, providing a new version of a select limited use secure environment to replace or update the second limited use secure environment.

14. A system, comprising:
- at least one processor; and
- a memory coupled to the at least one processor, wherein the memory stores program instructions, wherein the program instructions are executable by the at least one processor to:
  - receive an authentication request that includes a pairing code and a user credential, the pairing code associated with a limited use secure environment that, when loaded onto a computing device, takes at least partial control of the computing device, and limits features available to the computing device while accessing a resource of interest, the user credential associated with a user of the computing device;
  - perform a pairing operation based on the authentication request; and
  - present configuration credentials to the limited use secure environment that enable the computing device to establish a secure network connection through a gateway service with the resource of interest.

15. The system of claim 14, further comprising a portable data store that stores the limited use secure environment, the portable data store having a communications interface to be communicatively coupled to the computing device when loading the limited use secure environment onto the computing device.

16. The system of claim 15, wherein the portable data store include first and second storage partitions that store corresponding first and second limited use secure environments, wherein, while the first limited use secure environment is operating on the computing device, the first limited use secure environment is in a read only mode, while the second limited use secure environment is in a right mode to be overwritten with a new version of a select limited use secure environment.

17. The system of claim 14, further comprising an authentication server including an authorization service and a provisioning service, the authorization service performing the pairing operation, the provisioning service presenting the configuration credentials to the limited use secure environment over a network.

18. The system of claim 14, further comprising an authorization service that receives the authentication request from a trusted client device, the authentication request including the user credential and the pairing code, the authorization service determining whether the pairing code and user credential match an approved pairing code and approved user credential.

19. The system of claim 14, further comprising causing the limited use secure environment to randomly generate the pairing code when the limited use secure environment is activated on the computing device.

20. The system of claim 14, further comprising a provisioning service configured to receive a code request from the limited use secure environment on the computing device, the provisioning service returning the pairing code in response to the code request, the pairing code representing at least a portion of an environment credential.

\* \* \* \* \*